(No Model.) 13 Sheets—Sheet 1.

W. BOWKER & R. WILLIAMS.
LOOM.

No. 448,202. Patented Mar. 17, 1891.

Fig. 1.

Witnesses:
John Sanderson
Gates W. Booth

Inventors:
William Bowker
Robert Williams (No Model.) 13 Sheets—Sheet 3.

W. BOWKER & R. WILLIAMS.
LOOM.

No. 448,202. Patented Mar. 17, 1891.

Fig. 3.

Witnesses:
John Sanderson
Gales W. Booth.

Inventors:
William Bowker
Robert Williams (No Model.) 13 Sheets—Sheet 4.
W. BOWKER & R. WILLIAMS.
LOOM.
No. 448,202. Patented Mar. 17, 1891.

Witnesses:
John Sanderson
Yates W. Booth.

Inventors:
William Bowker
Robert Williams

Fig. 5.

(No Model.) 13 Sheets—Sheet 7.
W. BOWKER & R. WILLIAMS.
LOOM.

No. 448,202. Patented Mar. 17, 1891.

Fig. 8.

Witnesses:
John Sanderson
Gates W. Booth.

Inventors:
William Bowker
Robert Williams.

(No Model.) 13 Sheets—Sheet 11.

W. BOWKER & R. WILLIAMS.
LOOM.

No. 448,202. Patented Mar. 17, 1891.

Witnesses:
John Sanderson
Gates W. Booth.

Inventors:
William Bowker
Robert Williams (No Model.) 13 Sheets—Sheet 12.

W. BOWKER & R. WILLIAMS.
LOOM.

No. 448,202. Patented Mar. 17, 1891.

Witnesses:
John Sanderson
Gates W. Booth

Inventors:
William Bowker
Robert Williams (No Model.) 13 Sheets—Sheet 13.

W. BOWKER & R. WILLIAMS.
LOOM.

No. 448,202. Patented Mar. 17, 1891.

Witnesses.
John M. Bevomme
Jonathan C. Ela

Inventors.
William Bowker
Robert Williams
by S. N. Piper, atty

UNITED STATES PATENT OFFICE.

WILLIAM BOWKER, OF WEST MEDFORD, AND ROBERT WILLIAMS, OF BOSTON, MASSACHUSETTS.

LOOM.

SPECIFICATION forming part of Letters Patent No. 448,202, dated March 17, 1891.

Application filed April 7, 1890. Serial No. 346,833. (No model.)

*To all whom it may concern:*

Be it known that we, WILLIAM BOWKER, of West Medford, in the county of Middlesex, and ROBERT WILLIAMS, of Boston, in the county of Suffolk, in the Commonwealth of Massachusetts, citizens of the United States, temporarily residing at Preston, in the county of Lancaster, England, have invented Improvements in Looms, of which the following is a specification.

This invention has for its object the weaving in a loom of cloth in which the weft or filling is introduced between each decussation or crossing of the warps in a double or two-ply form and to supply the said weft or filling from large bobbins or spools standing apart from the lay or slay, so as to obviate the inconvenience of and loss of time spent in replacing the cops or spools in loom-shuttles as ordinarily employed.

Letters Patent of the United States No. 375,335, dated December 27, 1887, were granted to us for a new and useful improvement in looms, the said improvement having for its object the weaving of cloth of the kind above indicated. The said improvement, however, among other devices, included the employment of two shuttles, (or weft-carriers,) a three-race rail on the lay, (necessitating the employment of drop-box mechanism,) and one supply spool or bobbin of weft or filling, the said weft in double or two-ply form being introduced between the warps in one direction—that is to say, from one end of the lay—only. According to this our present invention we employ only one shuttle or weft-carrier and only one race-rail, (the latter being of the kind usually employed in an ordinary loom,) and we introduce the double weft or filling between the warps from one of two supply-spools alternately, first from one end of the lay and then from the other, the double weft or filling in this respect being passed between each decussation or crossing of the warps first in one direction and then in the other in the same manner as obtains in weaving plain cloth with a single weft-thread in the ordinary way.

The apparatus we employ in conjunction with a loom of ordinary construction in carrying our present invention into effect comprises, first, a weft-carrier which takes the place of the shuttle ordinarily employed and by means of prongs or fingers on its upper side conveys the weft in double form through the "shed" first from one side of the warp and then from the other, the said weft-carrier being thrown or driven through the shed by picking mechanism of the usual character; secondly, a selvage-making device consisting of a selvage-thread shuttle and attendant mechanism (applied to the shuttle-box at each end of the lay) for lifting off and transferring the weft-thread from the weft-carrier after it has emerged from the shed and for causing the said weft-thread to move over and past the selvage-thread shuttle, so that the thread from the said selvage-shuttle may be caused to be passed through the loop of the double weft subsequently to its having been lifted or taken up from the weft-carrier; thirdly, cam-and-lever mechanism, actuated by the rotation of the ordinary tappet-shaft, for operating the said transferring and selvage-thread shuttle mechanism; fourthly, a rising-and-falling eyeleted jack with a tension device near each side or edge of the warp for guiding the weft-thread in position over the weft-carrier, so that the prongs or fingers on the upper side of such carrier may meet and carry along the said weft-thread as the said weft-carrier is driven into the shed, and for simultaneously guiding the weft-thread not in use on the opposite side of the warp to a lower position, so that the weft-carrier as it enters the opposite shuttle-box may pass over it, the said jack being operated by the to-and-fro motion of the usual rocking shaft, which actuates the harnesses or healds; fifthly, compensating take-up apparatus (operated from the tappet-shaft by cam-and-lever mechanism) to take up the slack of the weft-thread and impart the required tension or stretch to the double weft-thread last passed through the shed before the reed beats up, and thereby to tighten up the double weft-thread on the selvage-thread at the opposite side of the warp; sixthly, a weighted gripping device behind the said compensating take-up apparatus (also operated by cam-and-lever mechanism actuated by the tappet-shaft) for the purpose of seizing and holding firmly the weft-thread from the supply spool or bobbin while the take-up apparatus is operating; seventhly, one or more rollers or pressers and springs arranged within a hinged box (hereinafter termed a "tension-box") behind the gripping device for the purpose of securing a uniform delivery of the weft and for taking out the kinks in the weft-thread as it arrives from the supply spool or bobbin, and also to prevent the said weft- thread from running too freely to the weft-carrier while the said weft-carrier is drawing or dragging the weft through the shed; eighthly, a device for momentarily withdrawing the pressure of the rollers or pressers and springs in the tension-box from off the weft-thread when the weft-carrier as it enters the shed first meets and exerts a sudden pull upon the weft-thread, the said device being actuated by the movement of the ordinary "picking-arm" or other suitable cam-and-lever arrangement, and, ninthly, "knock-off" apparatus for stopping the loom in the event of either the weft-thread or the selvage-thread breaking.

The remaining parts of the loom are constructed and operate in the usual manner.

In the accompanying drawings, Fig. 5 illustrates the arrangement, partly in cross-section, of the compensating take-up apparatus, the gripping device, the tension-box, and the knock-off apparatus hereinbefore referred to. Fig. 6, Sheet 12, is a side elevation of the gripping device drawn to a larger scale. Fig. 10 is another front view of the same parts, showing their altered positions when the weft-carrier has wholly passed under the transferring mechanism and the said mechanism, with its attendant parts, has been moved to the right by the action of the operating cam-and-lever mechanism hereinbefore referred to. " Figs. 13, 14, and 15 are respectively side, end, and plan views of the lifting or transferring finger. Figs. 16, 17, and 18 are respectively side, end, and plan views of an intermediate lifting-plate which supports in a recess therein the projecting side bearing of the selvage-thread shuttle. Fig. 19 is a plan view, and Fig. 20 a back view, showing the intermediate lifting-plate in working position as regards the lifting or transferring finger. Fig. 21 is an end view, and Fig. 22 a side view, of the selvage-thread shuttle. Fig. 23 is a section of Fig. 22, and Fig. 24 a cross-section of Fig. 21. Figs. 25 and 26 are respectively side and end views of the selvage-thread shuttle as seen from the back or opposite side to that shown in Figs. 22 and 21. Fig. 27 is an end view of the selvage-thread shuttle when the latter is in the position for the weft-thread to be drawn over and past it, as shown in side view at Fig. 28, (see broken lines and the position of the double weft-thread at Fig. 10,) and shows at the left-hand side (of the said Fig. 27) more clearly the form or shape of the bearing we preferably form upon the side of the said shuttle. Figs. 29 and 30 are corresponding views to Figs. 19 and 20, showing the working position of the selvage-thread shuttle as regards the said intermediate lifting-plate and the lifting or transferring finger. Fig. 31 is a plan view illustrating the composition of the cloth and the formation of the selvages thereof resulting from the employment of apparatus in accordance with our said invention. Fig. 32 is a sectional side view, and Fig. 33 a back view, of the eyeleted part of the rising-and-falling jacks, showing the arrangement of the tension device we employ in conjunction therewith.

Similar letters and numerals refer to similar parts throughout the several views.

A is the loom-framing; B, the lay; C, the lay-swords; D, the reed; E, the rocking shaft for sustaining the harnesses or healds; F, one of the pickers; G, the breast-beam; H, the cloth-roller; I, the knock-off shaft; J, the crank-shaft; J' J', rods connecting the lay to crank-shaft; $J^2$, a fast pulley and $J^3$ a loose pulley on the crank-shaft; $J^4$, a pinion fixed to the crank-shaft, engaging gear $J^5$, fixed to the tappet-shaft K; K, the tappet-shaft; L L', the operating-cams; M M', the levers, and $M^2 M^2$ the lifting-rods for operating the sliding transferring and selvage-thread shuttle mechanisms; N, the lever and N' the rod for actuating the take-up apparatus; O, the lever and O' the rod for actuating the gripping device. P P are the picking-arms; Q Q', the supply spools or bobbins of weft or filling; R R', bell-crank levers whose approximately horizontal arms are jointed to the upper ends of the rods $M^2 M^2$; S, a groove or recessed plate forming the bearing for the sliding transferring and selvage-thread shuttle mechanism at each end of the lay; T, the weft-carrier; U, an ordinary form of back swell pressure; V, the ordinary knock-off finger, and W the usual sliding shoe for liberating the knock-off handle, (the said handle and attendant parts being omitted in order that the other apparatus may be more conspicuously apparent.)

Figure 7:
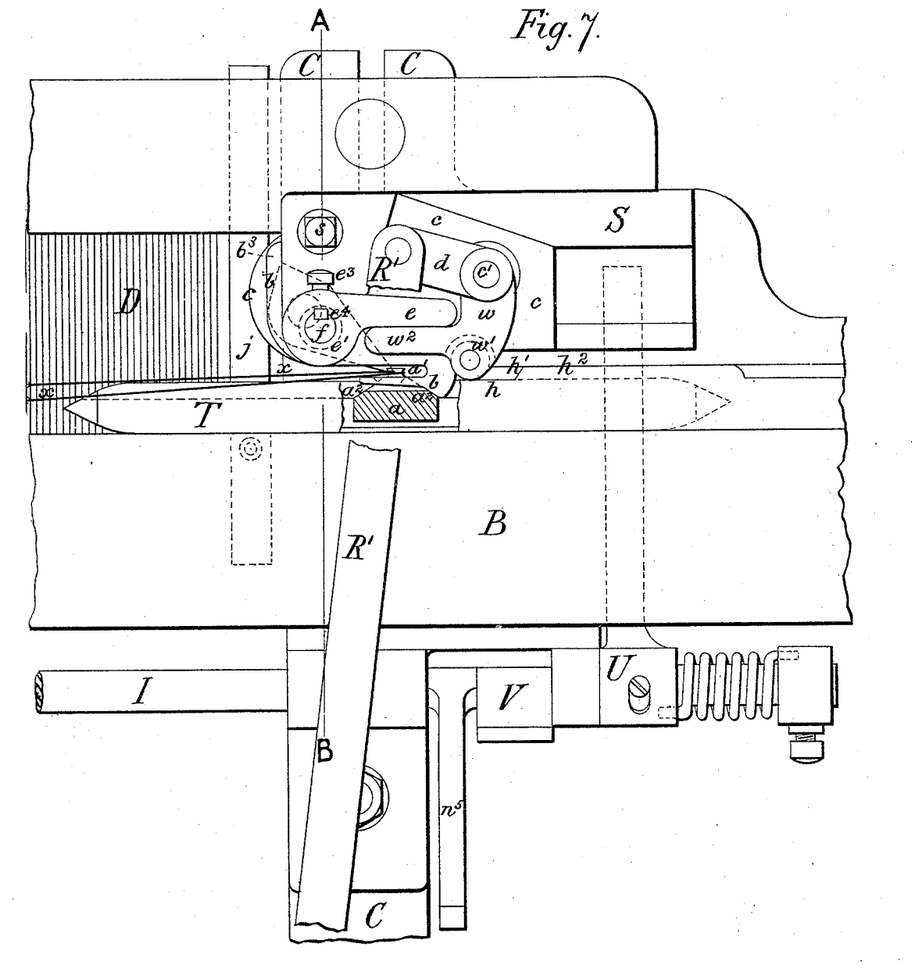
Fig. 7 is a front view of the right-hand part of the loom-lay and shuttle-box and certain attendant parts, in which is shown the relative position of the weft-carrier to the mechanism for lifting and transferring the double weft-thread onto the selvage - thread shuttle when the weft-carrier has so far entered the shuttle-box as to be in touching contact with the lifting-finger.
Figure 8:
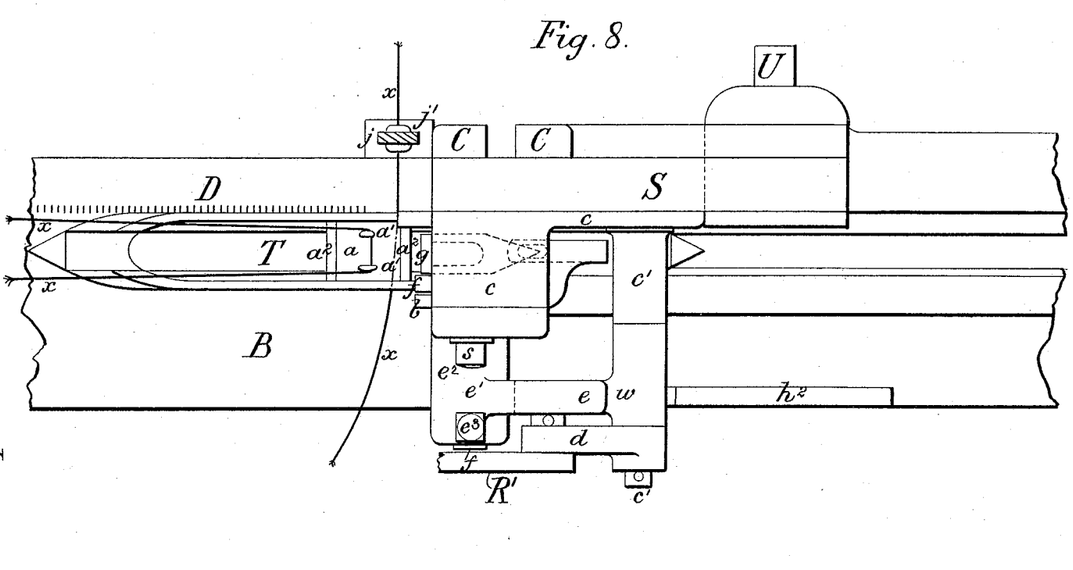
Fig. 8 is a plan view of the parts shown in Fig. 7, showing the position of the double weft-thread upon the prongs or fingers of the weft-carrier as the latter is emerging from betwixt the warps or shed, and also showing one of the eyeleted jacks holding the other weft-thread down so that the weft-carrier may pass over it, as hereinbefore mentioned.
Figure 9:
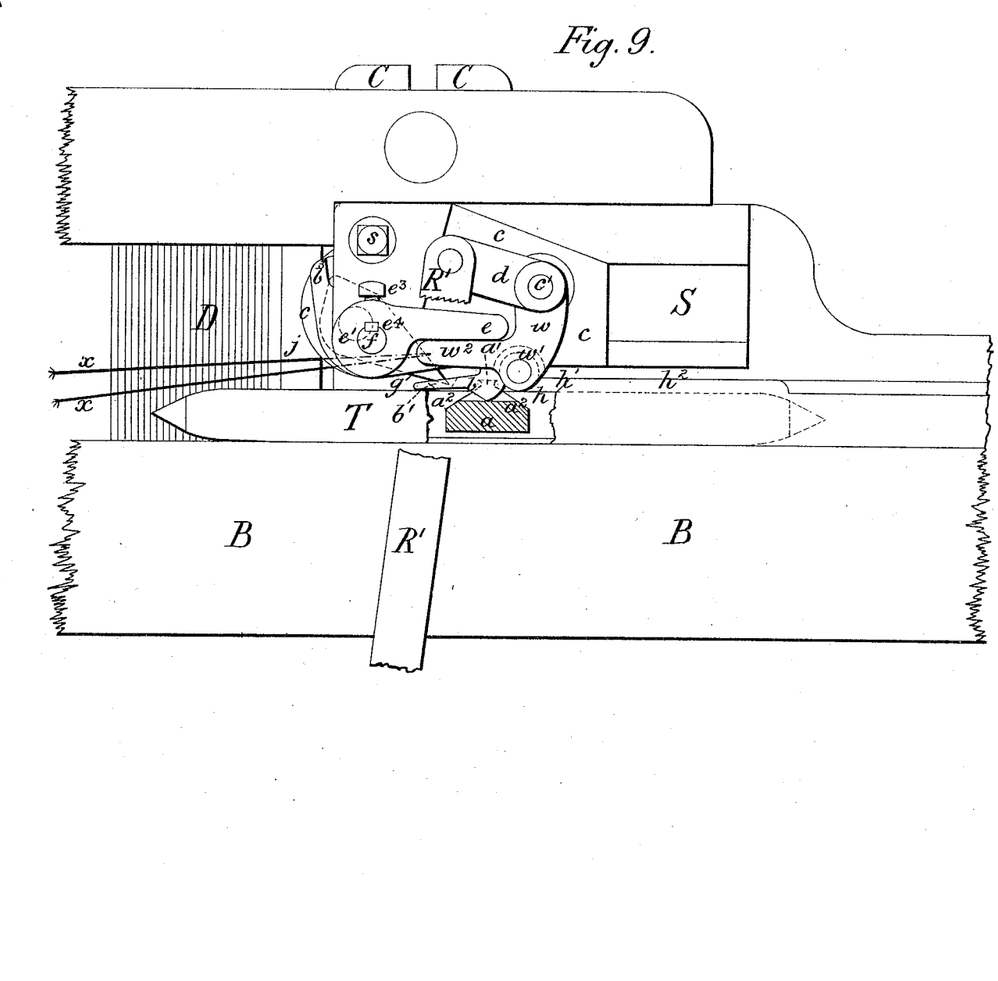
Fig. 9 is another front view of the same parts, showing the relative positions of the lifting-finger and the point of the selvage-thread shuttle when the said finger has been slightly raised by the passage under it of the central bridge of the weft-carrier.
Figure 11:
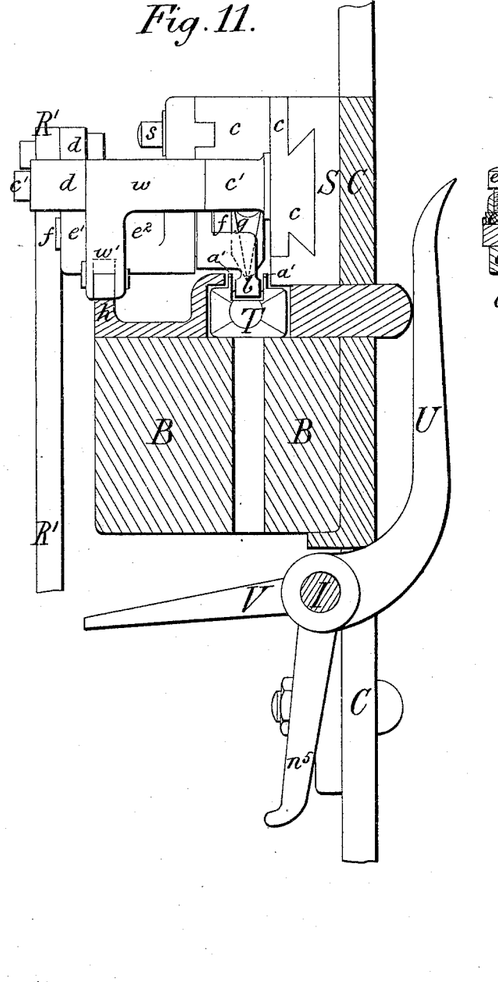
Fig. 11 is an end view, partly in section, of the mechanism shown at Fig. 7.
Figures 13, 14, 15, 16, 17, 18, 19, 20, 22, 23, 24:
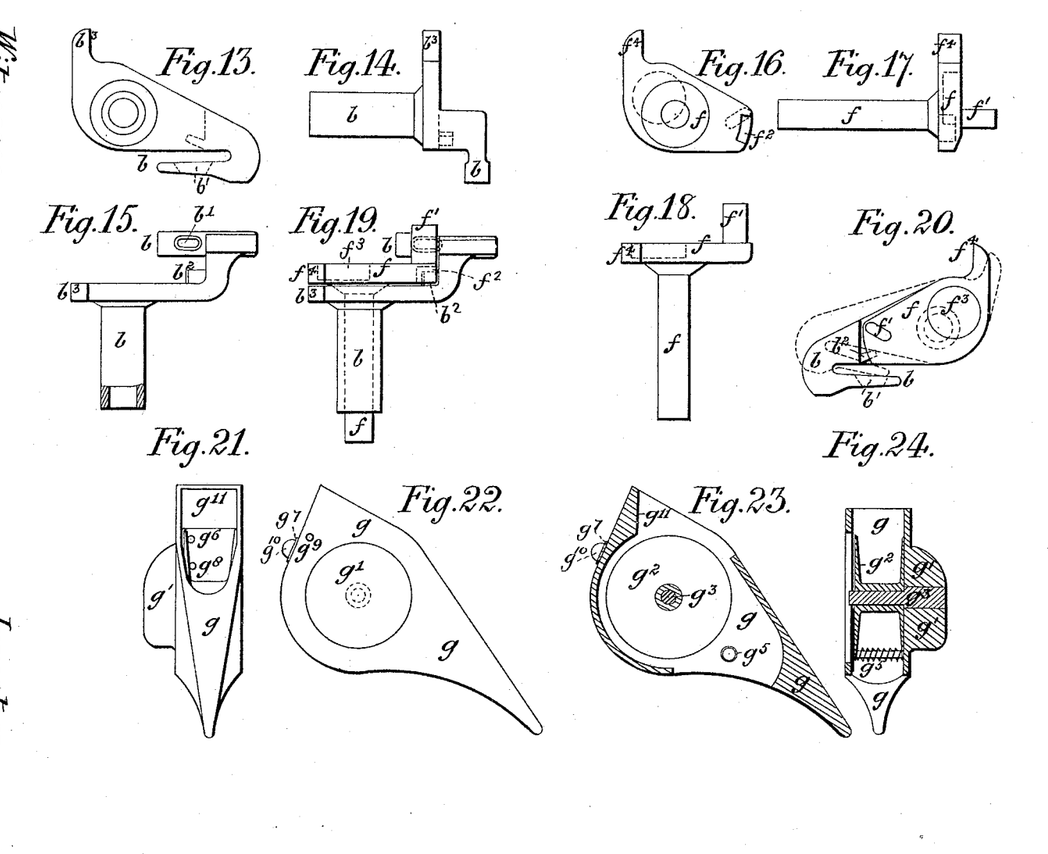
Figure 34:
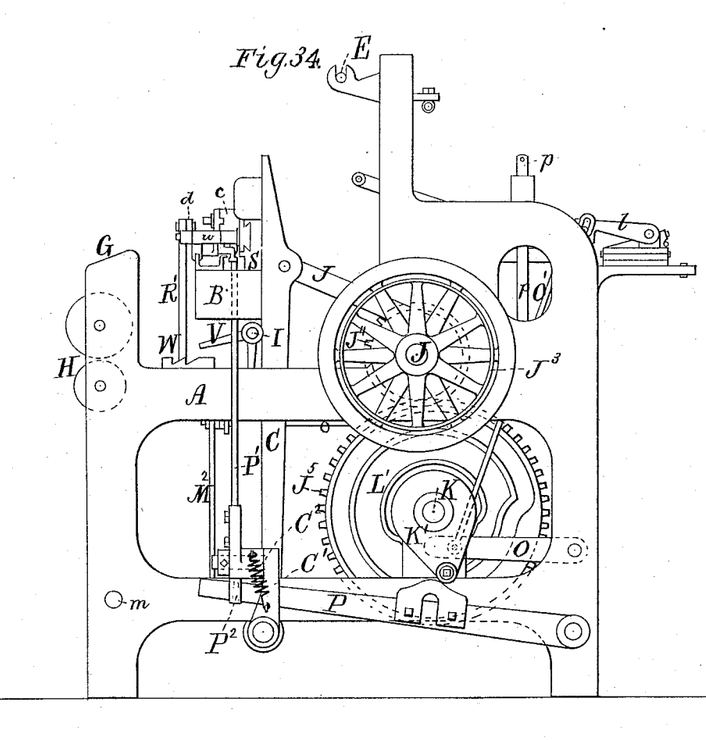
Fig. 34 is an end elevation of the loom.

P' P' are the picker-sticks, each being pivoted to an extension C' from the sword of the lay. Each of said sticks has fixed to it a leather loop $P^2$, through which the picking-arm P extends, said arm being actuated by a cam K', fixed to the shaft K. (See Figs. 2 and 34.) A spring $C^2$, attached at one end to the stick P' and at its other end to extension C', returns the stick to position after having thrown the weft-carrier T. The weft-carrier T has a central bridge or transverse piece $a$, whose upper side carries prongs or fingers $a'$ $a'$, which take hold of or engage with the weft-thread $x$. (See Fig. 8.) The upper part of the weft-carrier is cut or grooved out horizontally and longitudinally on each side of the bridge $a$, (see broken lines to the left of the bridge $a$ at Fig. 7; also plan view, Fig. 8, and end view, Fig. 11,) and the said bridge is formed with inclined surfaces $a^2 a^2$, which meet an inclined part on the lower side of the lifting or transferring finger $b$. (See Fig. 7.) As the carrier approaches the right-hand end of the lay, the inclined surface on the right hand of the bridge $a$ raises or lifts the said finger to the position shown in Fig. 9, in which raised position the finger $b$ will remain until the said bridge has passed forward from under the finger, which will thereupon drop down again to its former position. The purpose of so temporarily raising the finger $b$ is to lift off or remove the weft-thread from the prongs or fingers of the carrier T, the upward movement of the finger $b$ also causing the pointed end of the selvage-thread shuttle to enter a slot or opening $b'$ in the said finger, (see Fig. 15 and broken lines at Fig. 9,) whereby the passage of the weft-thread $x$ from the carrier onto the selvage-thread shuttle to the position shown in broken lines at Fig. 9 is assured.

$c$ is a sliding frame or back plate which engages with and is adapted to move in the grooved plate S, hereinbefore referred to. Said frame, together with the sleeved plate $c^6$, secured to it by the screw $s$, carries the transferring and selvage-thread shuttle mechanism, the said mechanism being detachable from the said back plate or frame by disengaging the fastening-screw $s$ when the selvage-thread shuttle is to be withdrawn from the frame for the purpose of inserting therein a fresh supply of selvage-thread. The plate $c^6$ is provided with a sleeve $c^7$, which receives and supports within it the sleeve of the lifting-finger $b$ of the selvage-thread shuttle mechanism, and the exterior of said sleeve $c^7$ supports the shell-bearing $e^2$ of the horizontal finger $e$, hereinafter referred to.

Figure 12:
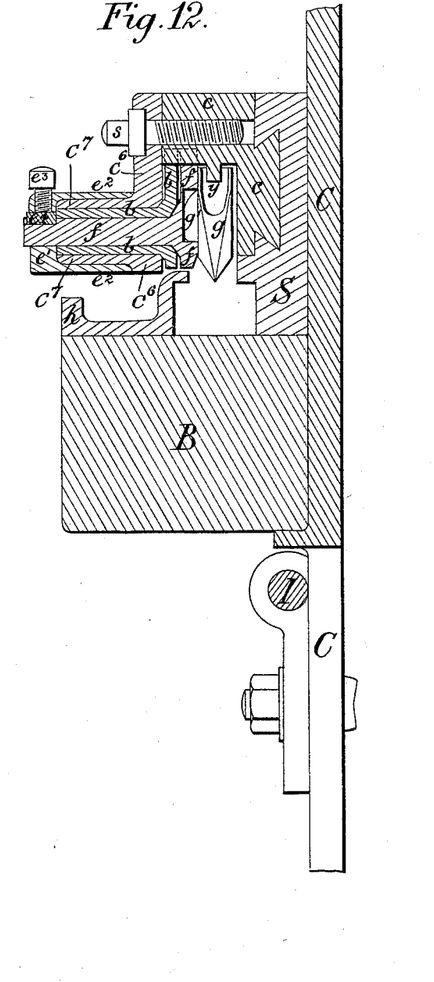
Fig. 12 is a cross-sectional view, the weft-carrier being omitted, as taken at the line A B, Fig. 7, the shuttle $g$ and screws $s$ and $e^3$ being shown in elevation. The parts of the shuttle-box and attendant mechanism at the left-hand side of the lay correspond with those at the right-hand side thereof, (shown in Figs. 7 to 12,) but are arranged in the reverse way, as will be well understood, the same observation applying to the other parts of the apparatus constructed in duplicate, the said parts being made "right and left hand.

$c'$ is a fixed stud mounted on the sliding back plate $c$, upon which one end of a connecting plate or link $d$ is jointed, the other end of the said link being jointed to the upper end of the upright arm of the lever R'. The fixed stud $c'$ also answers as the pivot or fulcrum of a bent lever $w$, provided with a friction roller or bowl $w'$. The horizontal finger $w^2$ of the bent lever $w$ stands under another horizontal finger $e$, projecting from a boss $e'$, having an elongated or shell bearing $e^2$, (see Fig. 12,) fastened by means of a set-screw $e^3$ and a key $e^4$ to the axis or spindle of the intermediate lifting-plate $f$. (Shown detached at Figs. 16, 17, and 18.) This intermediate lifting-plate $f$ is formed with a projecting stop or guard $f'$, which keeps the pointed end of the selvage-thread shuttle in place over the slotted finger $b$; but the said stop stands at such a distance above the shuttle-point as to leave room for the free passage of the weft-thread over the shuttle after having been taken or lifted off the weft-carrier T. The plate $f$ is also formed with a groove or recess $f^2$, within which a pin or stop $b^2$, projecting from the back of the lifting-finger $b$, is free to move to the extent required when the bridge of the carrier raises the lifting-finger, as hereinbefore described. The stop $b^2$ rests on the lower end of the groove $f^2$, which is so placed that the finger $b$, when in its lowermost or normal position, stands at a lower level than the weft-thread on the prongs or fingers $a'$ $a'$ of the carrier T. The lifting-plate $f$ is also formed with a circular opening or recess $f^3$, which receives the projecting side bearing $g'$ of the selvage-thread shuttle $g$. (See Figs. 12, 29, and 30.) The selvage-thread shuttle incloses a spool $g^2$, upon which is wound the selvage-thread, the said spool fitting easily on the fixed pin $g^3$ and being held in place by a flat spring $g^4$, capable of being moved round out of the way, as shown in dotted lines in Fig. 25, when the spool is to be withdrawn from the shuttle, the spiral spring $g^5$ serving to press the flat spring $g^4$ against the inner flange of the spool, and thereby to produce the required degree of frictional contact therewith. The selvage-thread is drawn from the spool $g^2$ through the hole $g^6$ under the tension-spring $g^7$, then through the hole $g^8$ (see Fig. 26) and another hole $g^9$ in the side of the shuttle, (see Fig. 22,) and thence to the edge of the cloth or warp.

$g^{10}$ is a regulating-screw for adjusting the pressure of the tension-spring $g^7$.

The action of the transferring and selvage-thread shuttle mechanism, as above decribed, is as follows: As the carrier T enters the shuttle-box its central bridge $a$ meets the incline on the rear lower part of the lifting-finger $b$, thereby raising the said finger, which in its upward movement lifts off the loop of the weft-thread from the carrier onto the pointed end of the selvage-thread shuttle. The bridge $a$, having passed forward clear of the lifting-finger $b$, the lever R' is caused by its operating-cam on the tappet-shaft to move the sliding transferring and selvage-thread shuttle mechanism to the right, (see Fig. 10,) the bowl $w'$ on the bent lever $w$ during this movement traveling along the upper edge of rail $h$ and being drawn against an incline $h'$ and onto a raised part $h^2$ of the said rail. The finger $w^2$ is thereby forced upward, at the same time pushing up the finger $e$ (see Fig. 10) and with it the lifting-plate $f$ and the lifting-finger $b$, the selvage-thread shuttle being thereby brought round to the position indicated in broken lines at Fig. 10 (shown also at Fig. 28) and allowing the double weft-thread (by the action of the take-up apparatus hereinbefore referred to and the forward or beating-up movement of the lay) to be drawn over and away from the selvage-thread shuttle, and consequently over the selvage-thread, which stretches from the hole $g^9$ in the shuttle to the edge of the woven cloth. The transferring mechanism and selvage-thread shuttle remain in their turned-up positions until the carrier T has been again ejected or picked from the shuttle-box, whereupon the operating-cam causes the said mechanism to be moved or slid back and the fingers $e$ and $w^2$, the lifting-plate $f$, and shuttle $g$ to resume their original positions, as shown at Fig. 7, the receding movement of the lay and the said return movement of the sliding mechanism being in unison, so that the required tension on the selvage-thread is maintained, the said selvage-thread remaining stretched, so as to be above and clear of the prongs or fingers of the carrier T when it is again ejected from the adjoining shuttle-box.

$b^3$ and $f^4$ are projecting stops on the lifting-finger $b$ and the lifting-plate $f$, respectively, which, on the return movement of the parts, as described, meet the end face of the back plate $c$, (see Figs. 7 to 10,) and the vertical face $g''$ on the shuttle $g$ (see Figs. 21 and 23) forms a stop for a similar purpose, the said face meeting a depending projecting part $y$ on the end of the back plate $c$. (See Fig. 12.)

Figure 1:
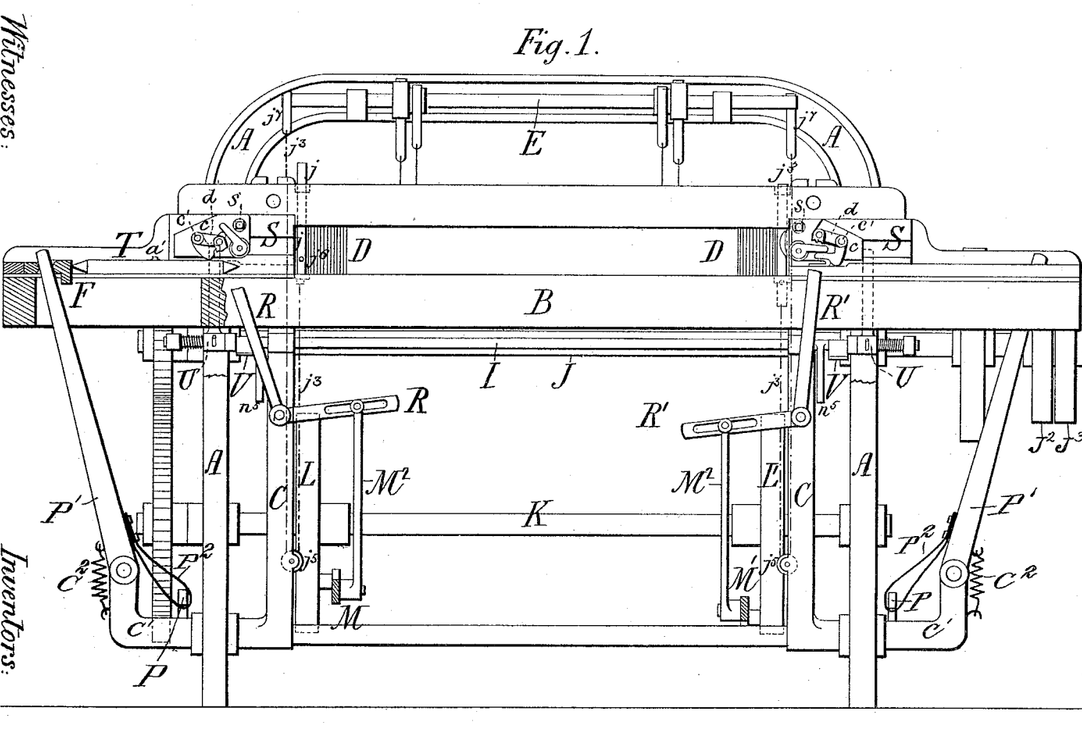
Figures 1 and 2 are respectively front and plan views, partly in section, of so much of an ordinary loom as is necessary to illustrate the method of applying certain parts of our invention thereto, the breast-beam, the cloth-roller, and other parts being omitted from the showing of Fig. 1.
Figure 10:
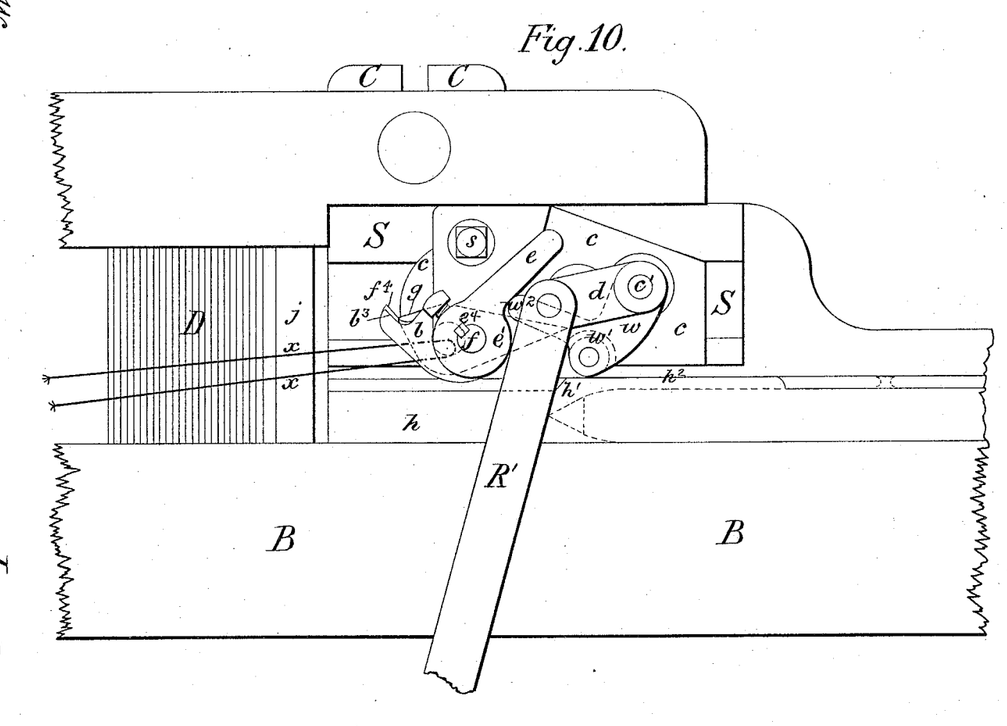

The arrangement of the cam-and-lever mechanism for operating the transferring and selvage-thread shuttle mechanism hereinabove described is partly shown at Figs. 1 and 2 and partly at Figs. 3 and 4. The levers M and M' are carried or jointed on fixed studs or pivots $m^2$, and each of the said levers carries at its free end a bowl (shown in broken lines at Figs. 3 and 4) which enters the controlling-groove or guide-path on the face of the operating-cam. Only one of the said levers is shown at Figs. 3 and 4—namely, the lever M' (see Fig. 1)—and the broken lines shown on the representation of the cam L at Figs. 3 and 4 indicate the position of the groove on the inner or left-hand face of the farther cam L', a corresponding groove being also on the inner or right-hand face of the cam L. In Fig. 3 the groove on the cam L' (in broken lines, as stated) and the lever M' (which is indicated partly in broken lines in the said Fig. 3) are in the position which obtains when the transferring or sliding mechanism at the right-hand side of the loom is in its normal position—that is to say, as shown at Figs. 1 and 7—the lever M' being then in its lowest position. In Fig. 4 the said groove and the lever M' are shown in the altered position which obtains as the lever is being lifted by the rotation of the said cam L' to its highest position, when the sliding mechanism will have been moved back, as shown at Fig. 10. When at its highest position, the lever M' is retained therein by reason of the configuration or curvature of the cam-groove, which is so formed as to impart the required duration of "dwell" during the period elapsing between the turning up of the transferring and selvage-thread shuttle mechanism and the ejection from the shuttle-box of the weft-carrier hereinabove referred to.

As before stated, there are corresponding grooves on the inner faces of the two cams L and L', the groove on one of the cams being in advance of the groove on the other cam as regards the rotation of the tappet-shaft to the extent of half a revolution, the cams being so located or fixed on the tappet-shaft relatively to the rotation of the crank-shaft that the levers M and M' will be alternately raised as the lay is beating up and assuming a vertical position (see Fig. 4) and lowered again as soon as the weft-carrier has been ejected for the next "pick" from the one shuttle-box or the other whose sliding mechanism has last been actuated by one of the said levers M or M'.

At each end of the lay at the back of the reed is a rising-and-falling eyeleted device in the form of a "jack" $j$, supported in bearings $j'$ $j'$, so as to be movable vertically therein, and having a hole or eyelet $j^6$, through which the weft-thread passes, each of the said jacks being provided with a spiral spring $j^2$ for forcing it upwardly.

Figures 6, 25, 26, 27, 28, 29, 30, 31, 32, 33:
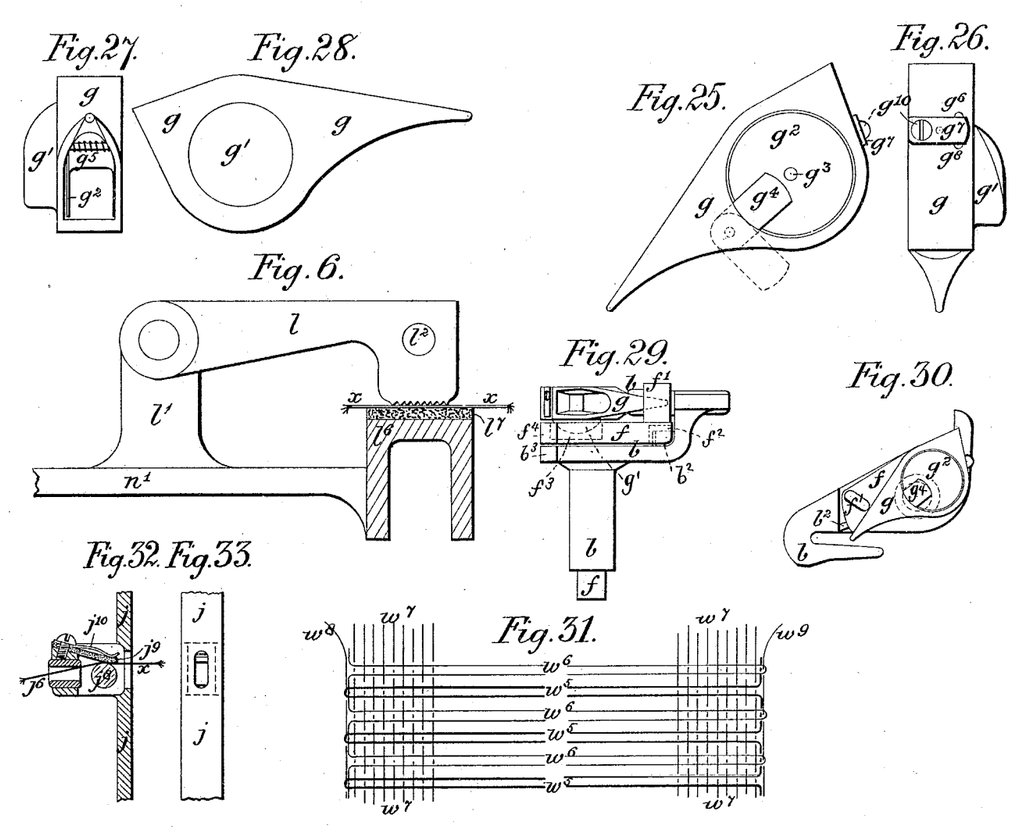

At Figs. 32 and 33, $j^6$ is the eyelet; $j^8$, a glass cross-bar; $j^9$, a presser, preferably made of felting, and $j^{10}$ a spring which presses the felting down upon the glass cross-bar $j^8$, the weft-thread $x$ passing between the said felting and cross-bar, and thereby receiving the drag or tension necessary to insure its remaining taut or tightly stretched during the receding or backward movement of the lay in readiness to be taken hold of by the carrier at the next pick. Cords $j^3$, each attached at one of its ends to the lower end of one of the jacks, pass over guide-pulleys $j^4$ and $j^5$, their other ends being connected to the depending ends of belts or thongs $j^7 j^7$, fastened to the rocking shaft E. (See Figs. 1, 3, and 4.) Thus the rotation of the said shaft E in one direction or the other causes one of the jacks to be lowered (as shown to the right of the reed in Figs. 1, 7, and 8) and the other jack to be raised simultaneously, (as shown to the left of the reed in Fig. 1,) the raised jack holding up its weft-thread at a suitable height in readiness to be taken hold of by the prongs or fingers of the weft-carrier when the latter is ejected from the adjoining shuttle-box and the lowered jack bringing down its weft-thread, so that the said thread will rest upon the surface of the lay or race-rail and allow the weft-carrier to pass over it (see Fig. 8) as it emerges from betwixt the warps and enters the shuttle-box.

Figure 2:
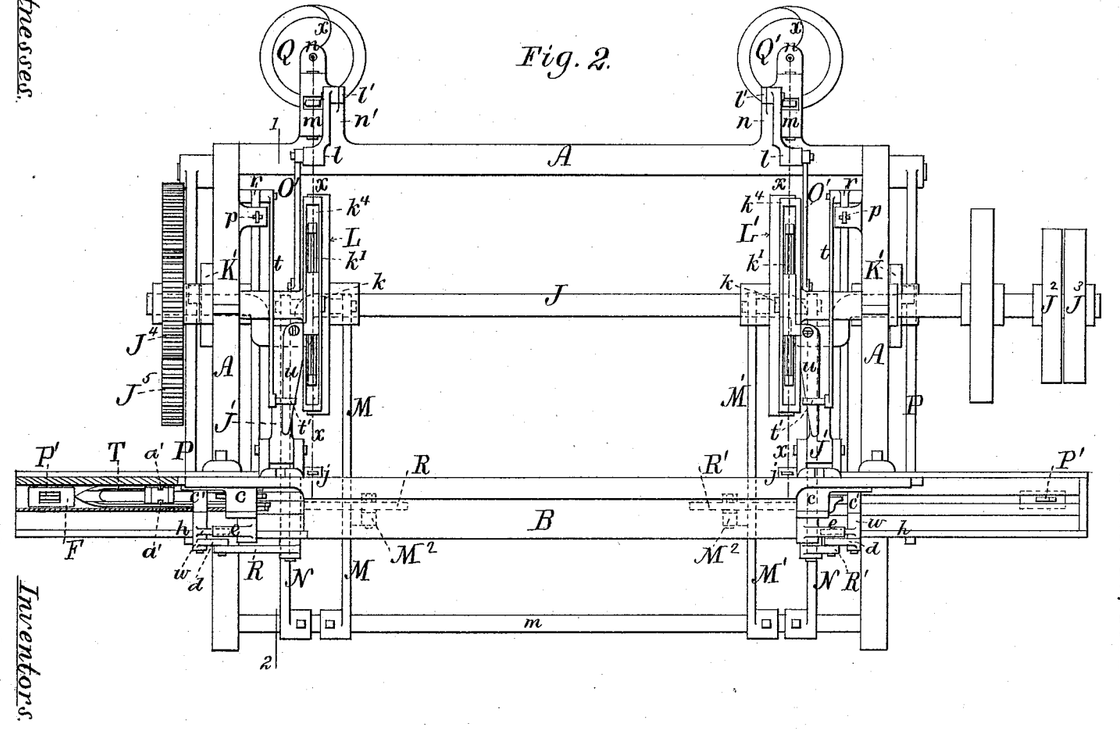
Figure 3:
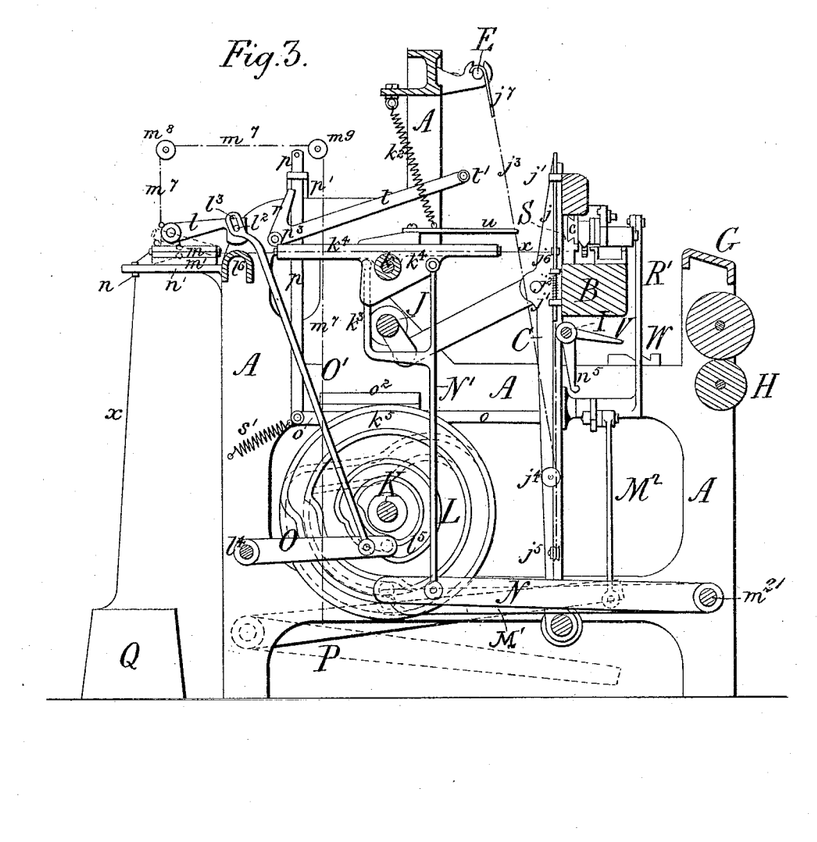
Figs. 3 and 4 are cross-sectional views of the same loom, taken at about the line 1 2 of Fig. 2 and illustrating the arrangement in side view of certain of the above-named devices and mechanism.
Figure 4:
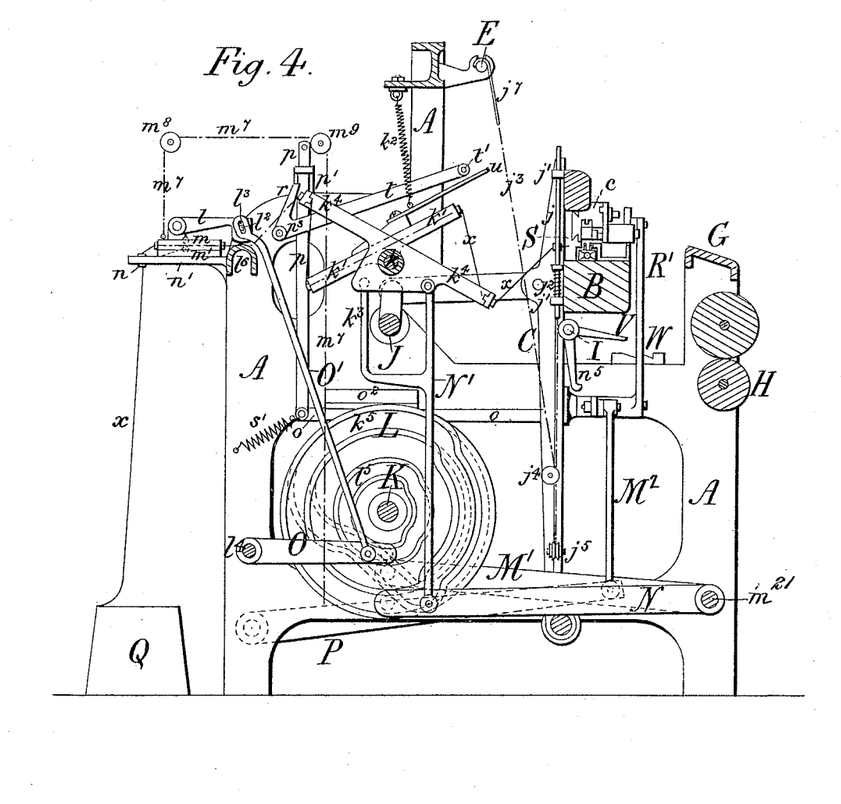
Figure 5:
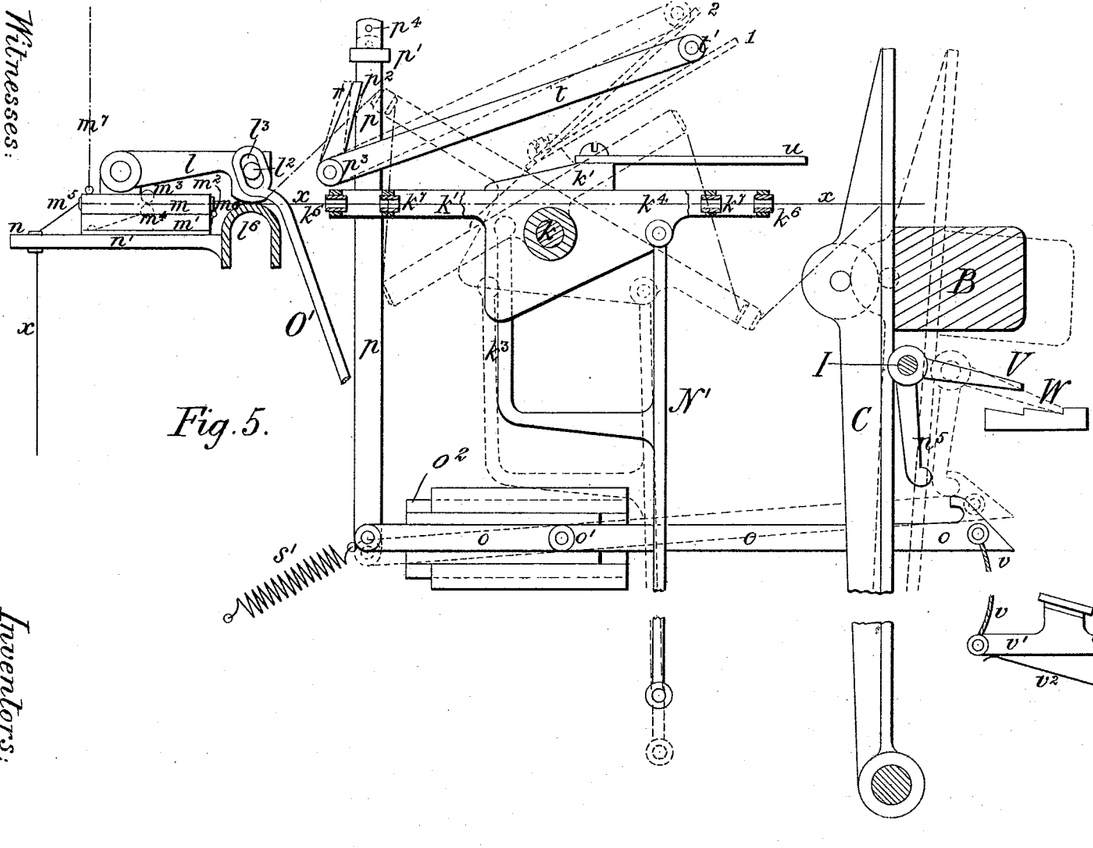

The compensating take-up apparatus and gripping device are shown in plan view at Fig. 2, side views thereof being shown at Figs. 3 and 4, and a sectional side view at Fig. 5.

The take-up apparatus comprises two eyeleted arms (the eyelets $k^6$ and $k^7$ being shown in section at Fig. 5) moving or vibrating one within the other in opposite directions on a common center or axis $k$, projecting from the inner side of the end framing A of the loom. The inner arm $k'$ is operated in one direction by the upward pull of the spiral spring $k^2$ and in the other direction by the upward push on its lower side of the upper extremity or rounded head of an arm $k^3$, forming part of the rod N', the latter at its lower end being jointed to the lever N and at its upper end to the longer or outer arm $k^4$, to which it imparts a downward and an upward or return movement, as required. A bowl (shown in broken lines) on the free end of the lever N enters the groove $k^5$ of the cam. (See outer groove or guide-path in solid lines of the cam L, Figs. 3 and 4.) In Fig. 3 the lever N is shown in its highest position—that is to say, when the take-up apparatus is closed or in its normal position—and in Fig. 4 when the arms $k'$ and $k^4$ are distended or opened out, the lever N being then in its lowest position, as shown. It will be observed that while the amount of movement of the longer or outer arm $k^4$ is arbitrary (being determined by the amount of lift or throw of the lever N) the amount of movement of the inner or shorter arm $k'$ is variable, being governed by the amount of slack in the weft-thread $x$, passing through the apparatus at the time being, to be taken up, the elastic spring $k^2$ moving the said arm to a greater or less extent, as required, as will be readily understood.

For the sake of clearness the take-up apparatus at the farther side of the loom is omitted from Figs. 3 and 4.

The gripping device comprises a weighted finger $l$, pivoted on the standard $l'$, the weighted end of the finger having a projecting pin $l^2$, which enters an elongated eye $l^3$ in the upper end of the rod O', the lower end of the said rod being jointed to the lever O, the said lever O working on a fixed stud or center $l^4$, its other or free end being provided with a bowl, (indicated in broken lines,) which enters a second or inner groove or guide-path $l^5$ on the face of the cam L. The lower face of the weighted end of the finger when holding or arresting the delivery of the weft-thread rests upon the upper side of a table $l^6$, the said face being preferably serrated, as shown in Fig. 6, the weft-thread $x$ being seized between the said serrated face and a covering of felting $l^7$ on the table, as shown at Fig. 6. In some cases the said lower face of the weighted end of the finger $l$ and also the upper side of the table $l^6$ are made convex in form, as represented in Figs. 3, 4, and 5; but the construction shown in Fig. 6 is usually adopted by us as being preferable. The cam-groove $l^5$ is so arranged as to cause the weighted finger to be lifted clear of the table $l^6$ (see Fig. 3) while its weft-thread is being pulled through the warps or shed by the weft-carrier, and to be lowered, and thereby to seize and hold the said thread firmly simultaneously with the removal or transferring of the weft-thread from the carrier to the selvage-thread shuttle, as hereinbefore described.

The tension-box comprises an upper part or lid $m$, hinged at $m^2$ to a lower part $m'$. (See Fig. 5.) The upper part $m$ carries a pivoted roller $m^3$, which presses the weft-thread upon the curved end of a spring $m^4$, fastened at its other end to the floor of the lower part $m'$. (Indicated in broken lines at Figs. 3, 4, and 5.) The two ends of the lid $m$ are provided with eyelets $m^5$ and $m^6$. The weft-thread $x$ from the supply spool or bobbin is passed through an eyelet $n$ in the arm or bracket $n'$, upon which the tension-box is carried, then through the eyelets $m^5$, between the presser-roller $m^3$ and the spring $m^4$, and through the eyelet $m^6$. In practice it is found that when the weft-carrier first meets or takes hold of the weft-thread, and the said thread is thereby subjected to a sudden pull or jerk, it is desirable to take the pressure of the tension-box momentarily off the weft-thread, and to this end we fasten one end of a cord $m^7$ to the free end of the hinged lid $m$, the said cord being passed over guide-pulleys $m^8$ and $m^9$ down to the picking-arm P, to which its other end is connected. The momentary lifting of the lid $m$ may also be effected by other convenient arrangements of cam-and-lever devices, if desired. The downward movement of the picking-arm when struck by the ordinary "picking-bowl" simultaneously effects the picking or throw of the weft-carrier from the shuttle-box and the momentary lifting or raising of the lid $m$. When coarse kinds of weft or filling are employed, one presser roller and spring, such as those shown in the drawings and hereinabove described, will usually be found to answer the required purpose; but when using the finer kinds of weft two, three, or more such rollers and springs are found in practice to be requisite, it having been demonstrated that it is better to apply the tension to the finer wefts in two or more places, using springs of very delicate adjustment, as by dividing the pressure on the weft there will be less friction thereon at any point, and therefore less liability of the weft being broken, than if the pressure is all applied at one point. The position of the lid $m$, when raised as above described, is indicated in broken lines at Fig. 3.

The construction of the knock-off apparatus is shown in side view at Fig. 5. To the ordinary knock-off shaft I we fasten a depending finger or catch $n^5$, which is designed to engage, as hereinafter explained with the hooked end of a horizontal lever or rocking bar $o$, pivoted at $o'$ on a stud or pin on the slide $o^2$, the other end of the lever $o$ being jointed to the lower end of a vertical bar $p$, mounted at its upper end so as to be movable vertically in a bracket or stand $p'$. (See also Figs. 2, 3, and 4.) The vertical bar $p$ is made with an indent or notch $p^2$, which receives the point of a detent $r$, projecting from the same pivoted boss $p^3$ as a lever or arm $t$. While the detent $r$ remains engaged with the notch $p^2$, the lever or arm $t$ will remain sustained in the position shown in solid lines at Fig. 5. At its outer or free end the lever or arm $t$ carries a projecting cross-finger $t'$, (see plan view, Fig. 2,) which occupies a position over or across a horizontal arm $u$, projecting from the upper part of the inner arm $k'$ of the take-up apparatus.

The action of the knock-off apparatus, as above described, is as follows: Under ordinary circumstances the arm $u$, when the take-up apparatus is distended, as hereinbefore described and shown in broken lines at Fig. 5, would not move up to a position higher than that shown by the broken lines indicated by the numeral 1, and consequently would not move high enough to reach the cross-finger $t'$; but should the weft-thread or the selvage-thread happen to break the pressure of the weft-thread upon the inner arm $k'$ would be withdrawn, whereupon the arm $u$ would fly up against the cross-finger $t'$ under the action of the spring $k^2$, and thereby lift the lever $t$ to the position shown in broken lines indicated by the numeral 2, the said lever $t$ at the same time moving detent $r$ out of the notch $p^2$, thus allowing the vertical bar $p$ to drop. The downward movement of the bar $p$ would thereupon depress that end of the horizontal lever or rocking bar $o$ to which it is connected, as shown in broken lines, causing the opposite or hooked end of the lever $o$ to be raised, the said hooked part being then in front of the finger or catch $n^5$, which upon the forward movement of the lay engages with the said finger $n^5$, thereby depressing the knock-off finger $n^5$ and causing it to engage with one of the notches in the shoe W, and thus to push the said shoe forward and so disengage the ordinary knock-off "spring-handle" and stop the loom. The cross-pin or stop $p^4$ determines the amount of drop to be allowed to the vertical bar $p$, and the diagonally-arranged spiral spring $s'$ answers the double purpose of imparting the required downward pull to the said bar $p$ and also to receive the shock or cushion the blow of the said finger $n^5$ with the hooked end of the lever $o$ when they meet or strike each other.

$v$ is a cord connected at one end to the hooked end of the lever $o$ and at its other end to a treadle $v'$, the said treadle preferably resting on a spring $v^2$ and being designed to be pressed down by the foot when the disconnection or disengagement of the finger $n^5$ and the lever $o$ is to be effected.

At Fig. 31 the darker lines $w^5$ indicate the double weft introduced between the warp-threads from the right-hand side of the loom, and the finer lines $w^6$ indicate the double weft supplied or picked from the left-hand side of the loom.

$w^8$ and $w^9$ are the selvage-threads.

We are aware that prior to our invention it had been proposed to produce cloth in a loom in which the weft or filling was to be introduced between each decussation or crossing of the warps in a double or two-ply form and to employ for such purpose a carrier having prongs or fingers on its upper side. We do not therefore claim the use of such a carrier, broadly; but

What we claim is—

1. In a loom, the combination, with a lay having a single race, of a thread-carrier arranged to travel in said race, mechanism for operating said lay and carrier, as set forth, and means, substantially as described, for supplying weft-thread to each side of the warp from two supply bobbins or spools disconnected from said lay and carrier, said carrier receiving its supply of weft-thread alternately from each of the two bobbins or spools in the manner described, so that it takes hold of and introduces a weft-thread in a double or two-ply form between the warps, first from one end of the lay and then from the other, selvage-making devices, one at or near each end of the lay, and mechanism for operating said devices to cause each of them to lay through a series of loops of the weft at one of the edges of the fabric woven, and a selvage-thread separate from the weft-threads, substantially as described.

2. In a loom, the combination of the carrier T, having a central bridge $a$ and prongs or fingers $a'$ $a'$, a lifting-finger $b$, having its free end normally at a lower level than the weft-thread upon said prongs or fingers and provided with an extension normally in the path of said bridge, and a selvage-thread shuttle having its point normally in close proximity to said finger, substantially as herein described, for the purpose set forth.

3. In a loom, the combination of the slotted lifting-finger $b$, provided with the stop $b^2$ and arranged to be operated in the manner set forth, a selvage-thread shuttle having its point normally in close proximity to said finger, a lifting-plate $f$, having a slot $f^2$ and a bearing for said shuttle and a projecting stop or guard over said shuttle, a rail $h$, having an inclined part $h'$ and a raised part $h^2$, a bent lever $w$, arranged to be actuated by said rail, a finger $e$, connected to said lifting-plate and arranged to be actuated by said bent lever, a sliding back plate $c$, by which said lifting-finger, lifting-plate, and bent lever are carried, and means for reciprocating said sliding back plate, substantially as herein described, for the purposes set forth.

4. In a loom, the combination, with the mechanism constituting the selvage-making device constructed substantially as described and carried by a sliding plate, of mechanism for actuating said plate and comprising a lever $R'$, connected to said plate, a lever $M'$, connected to said lever $R'$, and a cam $L'$ for operating said lever $M'$, substantially in the manner and for the purpose set forth.

5. In a loom, the combination of the lay, a carrier having hooks and arranged to travel on the race of said lay, means for operating said lay and carrier, selvage-making devices having mechanism for operating them, as specified, to cause them alternately to lay through the series of loops of the weft at each edge of the fabric woven, a selvage-thread separate from the weft-threads, with weft-thread compensating take-up apparatus comprising an inner vibrating arm $k'$, a spiral spring $k^2$, connected to said arm, an outer vibrating arm $k^4$, and means for operating said arms in the manner set forth, and a gripping device for holding the weft-thread during the operation of said take-up apparatus, substantially as set forth.

6. The combination of the compensating take-up apparatus comprising an inner vibrating arm $k'$, a spiral spring $k^2$, connected to said arm, an outer vibrating arm $k^4$, a connecting-rod $N'$ with arm $k^3$, a lever $N$, and a cam $L$, arranged to operate as specified, with a weighted device, as set forth, for gripping or holding the weft-thread $x$ during the operation of the said take-up apparatus, substantially as set forth.

7. The combination of a tension-box comprising a hinged upper part or lid $m$ with a presser roller or rollers $m^3$ and eyelets $m^5$ and $m^6$, and a spring or springs $m^4$ with a lifting device for momentarily raising the said lid $m$ at the required times, all arranged and operating substantially as specified, for the purpose set forth.

8. The combination of the knock-off apparatus comprising a lever or arm $u$, operated as set forth, a lever $t$, a cross-pin projecting from the said lever $t$, a detent $r$, a notched vertical bar $p$, a pivoted hook-lever or rocking bar $o$, a spring $s'$, a slide $o^2$, a catch $n^5$, a disengaging-treadle $v'$, and a cord $v$, with the ordinary knock-off shoe $W$, the ordinary knock-off finger $V$, and the ordinary knock-off shaft $I$ of a loom, all arranged and operating substantially as set forth.

In testimony whereof we have signed our names to this specification in the presence of two subscribing witnesses.

WILLIAM BOWKER.
ROBERT WILLIAMS.

Witnesses:
JOHN SANDERSON,
27 *Beech Street, Preston, England.*
YATES W. BOOTH,
30 *Guildhall Street, Preston, England.*